United States Patent [19]
Hirose

[11] Patent Number: 5,170,348
[45] Date of Patent: Dec. 8, 1992

[54] CHARACTER INPUT DEVICE HAVING TOUCH PEN TO ACTIVATE INPUT PANEL

[76] Inventor: Tokuzo Hirose, 13-13, Higashiyamacho, Ashiya-shi, Hyogo-ken, Japan

[21] Appl. No.: 715,310

[22] Filed: Jun. 10, 1991

Related U.S. Application Data

[63] Continuation of Ser. No. 418,637, Oct. 10, 1989, abandoned.

[30] Foreign Application Priority Data

Oct. 7, 1988 [JP] Japan .................. 63-254374

[51] Int. Cl.$^5$ .......................... G06F 3/02; G06F 3/023
[52] U.S. Cl. ..................................... 364/419; 400/489
[58] Field of Search .................. 381/51–53; 364/709.15, 419, 705.06, 708, 705.04; 400/486, 489

[56] References Cited

U.S. PATENT DOCUMENTS

| | | | |
|---|---|---|---|
| 4,070,649 | 1/1978 | Wright, Jr. et al. | 364/705.03 |
| 4,075,702 | 2/1978 | Davies | 367/705.02 |
| 4,120,037 | 10/1978 | Sato | 364/705.04 |
| 4,158,236 | 6/1979 | Levy | 364/900 |
| 4,159,536 | 6/1979 | Kehoe et al. | 364/900 |
| 4,224,675 | 9/1980 | Pinkerman | 364/705.02 |
| 4,253,143 | 2/1981 | Onodera et al. | 364/705.04 |
| 4,442,506 | 4/1984 | Endfield | 364/900 |
| 4,658,374 | 4/1987 | Tanimoto et al. | 364/900 |
| 4,737,040 | 4/1988 | Moon . | |
| 4,754,418 | 6/1988 | Hara | 235/380 |
| 4,758,977 | 7/1988 | Morimoto et al. | 364/900 |
| 4,832,191 | 5/1989 | Gerver et al. | 281/15.1 |
| 4,846,598 | 7/1989 | Livits | 400/472 |
| 4,860,234 | 4/1989 | Lapeyre | 364/709.15 |
| 4,891,777 | 1/1990 | Lapeyre | 364/709.15 |
| 4,918,631 | 4/1990 | Hara et al. | 364/708 |
| 4,927,279 | 5/1990 | Morgan | 400/489 |

FOREIGN PATENT DOCUMENTS

| | | |
|---|---|---|
| 3318622 | 11/1984 | Fed. Rep. of Germany . |
| 0263251 | 12/1985 | Japan . |
| 2149946 | 6/1985 | United Kingdom . |
| 2156552 | 10/1985 | United Kingdom . |

OTHER PUBLICATIONS

Patent Abstracts of Japan, vol. 12, No. 105 (M-681)[2952]-Apr. 6, 1988.
Patent Abstracts of Japan, vol. 7, No. 35 (P-175)[118-0]-Feb. 10, 1983.
8207 I.E.E.E. Micro, Apr. 7, 1987, No. 2, New York, N.Y. pp. 8-14.
"The Calcupen" by Chafitz, Washington Star, Nov. 9, 1975.
"Keyboard for Handheld Computer", IBM Technical Disclosure Bulletin, vol. 27, No. 10A, Mar. 1985, pp. 5643-5645.

*Primary Examiner*—Gail O. Hayes
*Attorney, Agent, or Firm*—Wenderoth, Lind & Ponack

[57] ABSTRACT

An alphanumeric character input device includes a character input panel located on a planar top surface of a flat housing. The character input panel includes a plurality of character input pads each having indicia thereon corresponding to alphanumeric characters. A plurality of switches are provided for activating in response to pressure applied to the character input pads. A contact pen having an elongated shape and a rounded end point is provided for contacting the character input pads. A display device and memory are provided for respectively displaying and storing alphanumeric characters inputted using the contact pen and the character inputs pads of the character panel. The flat housing further includes an aperture extending therein for accommodating the contact pin when the character input device is not in use. Additionally, the flat housing further includes a hand placement area on the planar top surface for resting the hand of an operator in a stationary position when such an operator is inputting characters using the contact pen.

2 Claims, 13 Drawing Sheets

Fig. 15 (1)
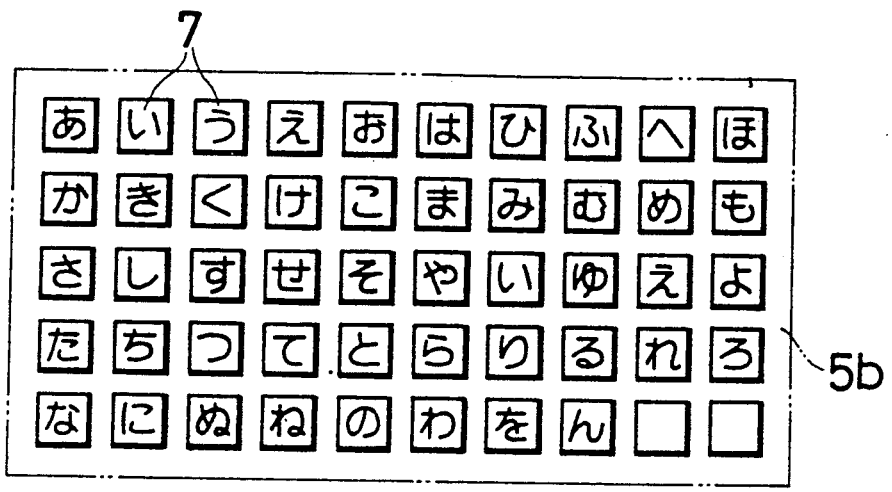
Fig. 15 (2)
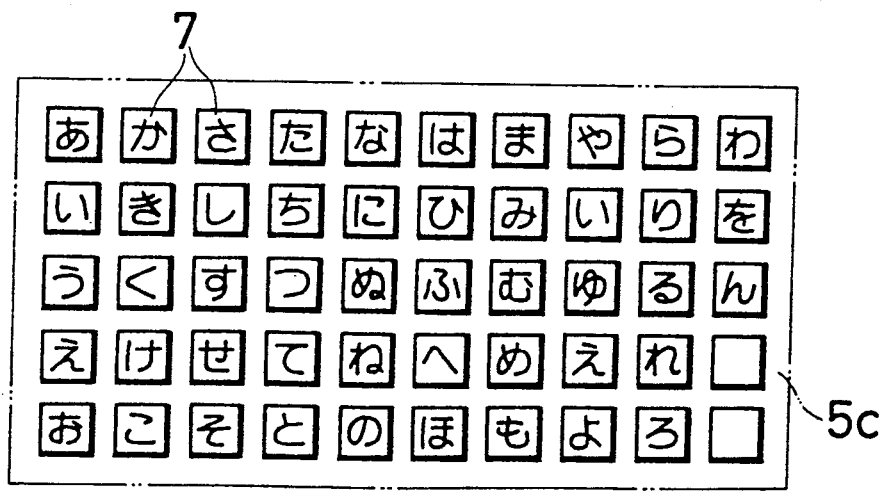

CHARACTER INPUT DEVICE HAVING TOUCH PEN TO ACTIVATE INPUT PANEL

This application is a continuation of now abandoned application, Ser. No. 07/418,637 filed on Oct. 10, 1989, now abandoned.

BACKGROUND OF THE INVENTION

1. Field of the Invention

This invention relates to a device for entering and storing characters using a pencil-like touch pen, and more particularly, to a small-sized character inputting device, a small-sized typewriter device, and a small-sized sentence editing device.

2. Description of the Prior Art

The speed with which characters can be handwritten using a pencil is comparatively slow. Even though handwriting of characters is customary, the writing speed is inherently limited and it is difficult to hand write characters at a significantly high speed.

Currently, a character input device is commercially available which is composed of numerous keys which are finger depressed by the user and which is operated using one or both hands of the user. Such a character input device is known to the public, in association with a conventional computer input device, a typewriter, a word processing machine, etc. There is a limit to the character input speed even in these prior art devices. It is desired that the character input speed be accelerated.

SUMMARY OF THE INVENTION

It is an object of the present invention to provide a small-sized character inputting device activated by a touch pen, a small-sized typewriter activated by a touch pen, and a sentence editing device activated by a touch pen, which are configured such that the character inputting speed can be significantly increased.

The touch-pen type small-sized character inputting device of the present invention includes a contact pen, and a character inputting unit provided with the character inputting panel having a plurality of character inputting switches. The contact pen is grasped in one hand of an operator. The plurality of the character inputting switches are arranged in such that a tip end of the contact pen can be freely moved with the lower part of the hand placed on a desk top. The character information is inputted by selectively touching the character inputting switches or applying pressure to the character inputting switches using the tip end of the contact pen.

In a preferred embodiment, the touch-pen type small-sized character inputting device includes a device for outputting in a visual or voice format the character information inputted by the character inputting device.

In another preferred embodiment the character inputting device is a flat rectangular shape.

In still another preferred embodiment, inputting switches corresponding to vowel letters are provided at either side of the character inputting panel.

In a preferred embodiment, the character inputting device includes a memory for storing the character information inputted using the inputting switches.

The sentence editing device of the present invention includes a contact pen, a flat rectangular shaped character inputting device, and an output device. The character inputting device includes a character inputting panel provided with a plurality of character inputting switches, a memory for storing character information inputted using the character inputting switches, a device for reading out of data stored in the memory, and an output terminal for outputting data read out from the memory. The output device includes an input terminal which can be connected to and disconnected from the output terminal, a device for editing and operation-processing of data inputted to the input terminal, and a display and printer for visually displaying and printing the output of the editing and operation-processing means.

The contact pen is grasped in one hand of an operator. The plurality of the character inputting switches are arranged such that the tip end of the contact pen can be freely moved with the lower part of the hand placed on the desk top. The character information is inputted by selectively touching the character inputting switches or applying pressure to the character inputting switches using the tip end of the contact pen.

The touch-pen type small-sized typewriter of the present invention includes a contact pen, a character inputting device provided with the character inputting panel having a plurality of character inputting switches, and an output device. The output device is provided with a printer for printing out on recording paper the character information inputted by the character inputting device.

In a preferred embodiment, the character inputting device and the output device are integrally combined in a single housing which has a flat rectangular shape.

The touch-pen type small-sized typewriter of the present invention includes a contact pen, a character inputting panel provided with a plurality of character inputting switches, a character inputting unit provided with a hand placement area in the vicinity of the character inputting panel so that the character inputting switches can be operated with the lower part of the hand placed thereon, and an output unit provided with a printer device for printing out the character information inputted using the character inputting panel.

The touch-pen type operation processing device of the present invention includes a contact pen, a character inputting unit provided with the character inputting panel having a plurality of character inputting switches, wherein the contact pen is grasped in one hand of an operator and the plurality of character inputting switches are arranged such that the tip end of the contact pen can be freely moved with the lower part of the hand placed on a desk top or in a fixed position on the character inputting unit and character information is inputted by selectively touching the character inputting switches or pushing down on the character inputting switches using the tip end of the contact pen, a unit for operation-processing on the basis of the character information inputted by the character inputting unit, and an output device for outputting the character information inputted by the character inputting unit and the results of the operation-processing by the operation-processing unit.

In a preferred embodiment, the character inputting unit, the operation-processing unit and the output device are integrally composed in a single housing which is a flat rectangular shape.

The touch-pen type operation processing device of the present invention includes a contact pen, a character inputting panel provided with a plurality of character inputting switches, character inputting device provided in the vicinity of the character inputting area with hand placement area in which the character inputting switch can be operated with the lower part of the hand placed thereon, a unit for operation-processing on the basis of the character information inputted by the character inputting device, and an output device for outputting the character information inputted by the character inputting device and the results of the operation-processing by the operation-processing unit.

The touch-pen type small-sized character inputting device of the present invention includes a contact pen and a character inputting device provided with a character inputting panel having a plurality of character inputting switches. The contact pen is grasped in one hand of an operator. The plurality of the character inputting switches are arranged such that the tip end of the contact pen can be freely moved with the lower part of the hand placed in a fixed position on the character inputting device. The character information is inputted by selectively touching the character inputting switches or by pushing down on the character inputting switches using the tip end of the contact pen.

According to the present invention, the operation is carried out by touching or pushing a plurality of character inputting switches with the tip end of a contact pen, that is, a touch pen. An operator grasps the contact pen with his more coordinated hand, that is, either of his right hand or his left hand, and characters are input using tip end of the contact pen, with the lower part of his hand in which the contact pen is grasped and placed at a predetermined position.

According to the present invention, it is possible to accelerate the inputting speed by making the character inputting panel small and by having the operator grasps the tip end of a contact pen.

A character inputting device according to the invention is small-sized and the weight thereof is reduced. Therefore, it is possible to carry the device in a portable manner.

Still further, character information inputted by the character inputting device according to the invention can be outputted using a liquid crystal display, a printer or a voice output device.

According to the present invention, since it is possible to store the character input information in a memory, the information in the memory can be outputted at some delayed time after inputting. The character inputting device according to the invention can be made smaller in size by being provided with memory unit without the output device. Thus, the character inputting device according to the invention can be used as a memorandum pad.

Since the character inputting panel is small, it may be difficult to read the characters displayed thereon, and the character inputting device may be composed so that a magnifying glass can be adopted therewith. This is very preferable especially for persons with bad eyesight.

Still further, since the vowel letters are arranged and concentrated at a point, i.e., the right or left side of the character inputting panel, it is easy to locate a specified character, thereby accelerating the character inputting speed.

Moreover, according to the invention, it is possible to input characters with the lower part of the hand placed on a desk top on which the character inputting device is placed or on a hand placement position of the character inputting device.

According to the present invention, character inputting can be processed at a significantly high speed. For example, it is possible to accelerate the character inputting speed to twice or more in comparison with the case of using the conventional writing device or the case of using the conventional key board. In addition, such a composition is significantly small-sized and the weight thereof is reduced.

BRIEF DESCRIPTION OF THE DRAWINGS

These and other objects, features and advantages of the invention will become more apparent from the ensuing description taken in conjunction with the accompanying drawings, in which.

DETAILED DESCRIPTION OF THE PREFERRED EMBODIMENT

The ensuing description explains the preferred embodiments of the invention in conjunction with the drawings attached hereto.

Figure 1:
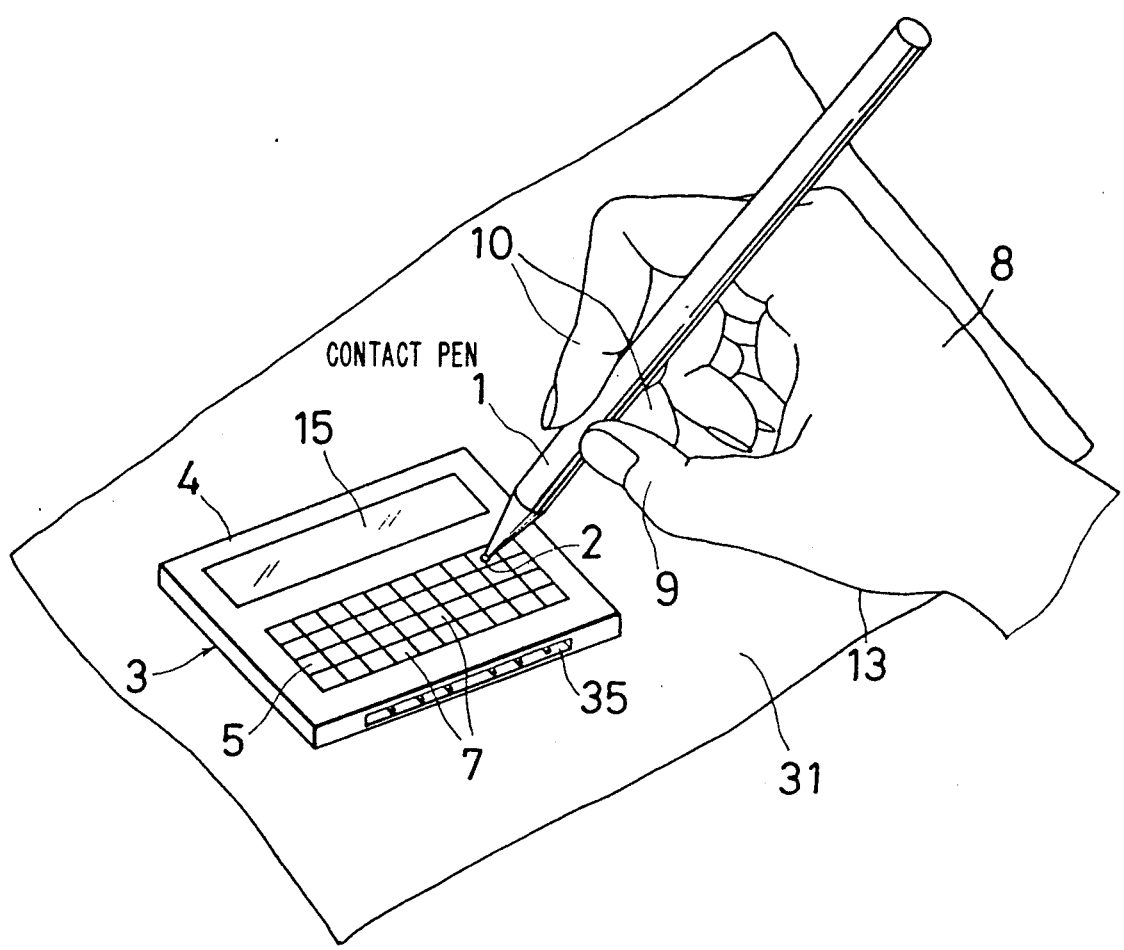
FIG. 1 is a perspective view showing the entire device of one of the preferred embodiments of the invention.

FIG. 1 is a perspective view of one of the preferred embodiments of the invention. A contact pen 1 is dimensioned and shaped similar to, for example, a pencil, a ballpoint pen and/or a fountain pen, and the tip end 2 thereof is rounded as shown. That is, the tip end 2 thereof is not overly pointed, thereby preventing damage to the character inputting panel 5. The contact pen 1 as shown may be made of a metal or an artificial resin.

A flat rectangular shaped housing 4 of the character inputting unit 3 is provided with a character inputting panel 5. The tip end 2 of the contact pen 1 is selectively made to contact and apply pressure the character inputting switches 7, which are provided in the character inputting panel 5, thereby resulting each character of each switch 7 to be inputted.

The above inputting operation is carried out with the lower part of the hand placed on a table or desk top area 31 on which the character inputting unit 3 is placed.

Figure 2:
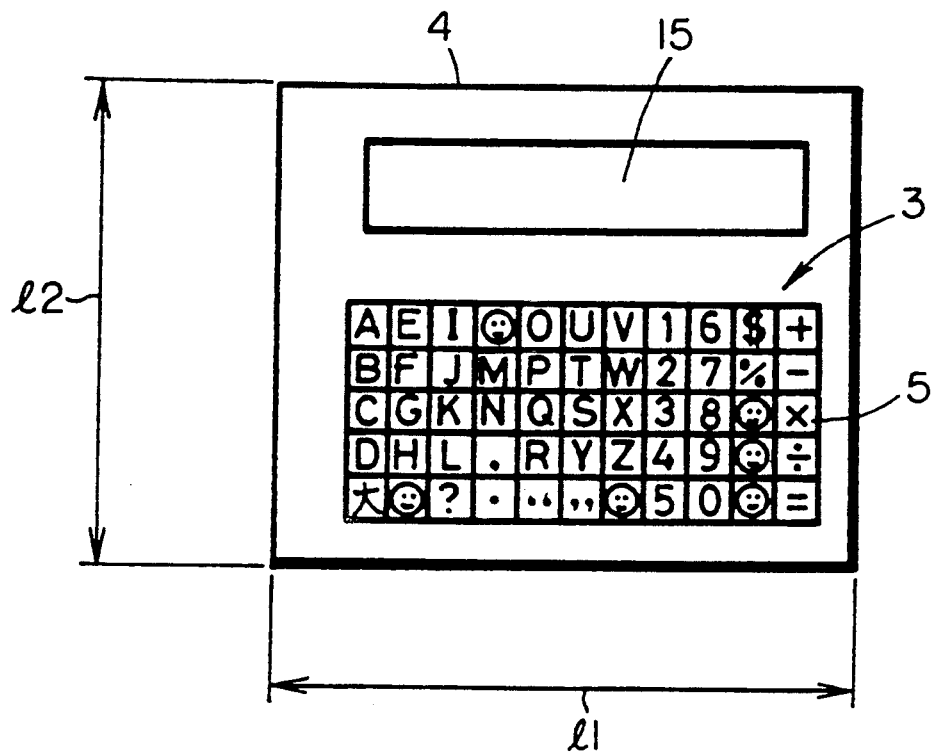
FIG. 2 is a plane view of character inputting unit 3.

FIG. 2 is a plane view showing the character inputting unit 3. In this embodiment, the housing 4 is provided with a character inputting panel 5 and an output display 15, such as a liquid crystal display, and the hand in which a contact pen is grasped is placed on the table or desk top 31 on which the housing 4 is placed. As an example, the dimension of the housing 4 is 8.5 cm for "l1" and 5.4 cm for "l2, the size being roughly equivalent to that of a credit card.

Figure 3:
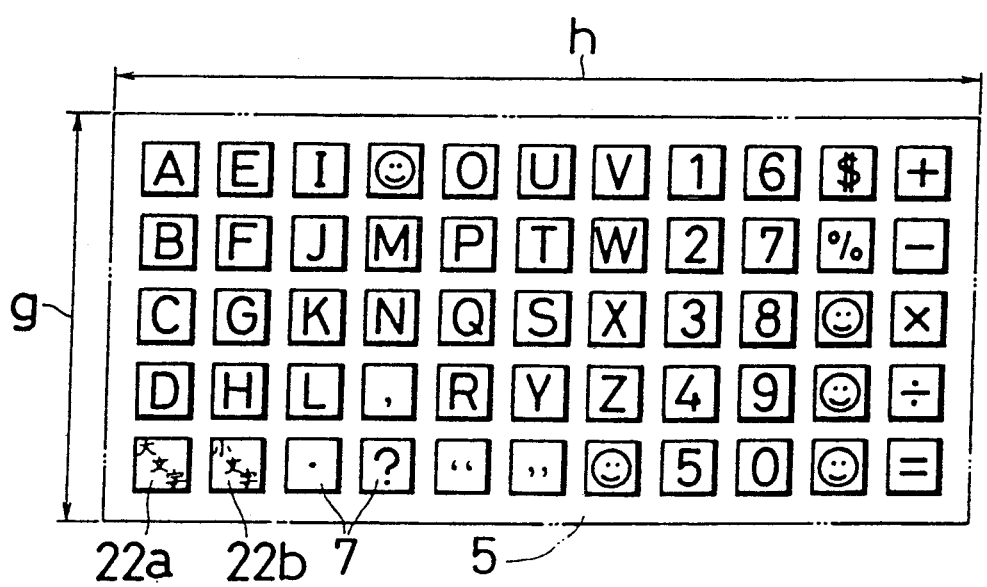
FIG. 3 is an enlarged plane view of the character inputting panel 5.

FIG. 3 is an enlarged plane view of the character inputting panel 5. The vowels of the alphabet are arranged longitudinally at the upper portion of the character inputting panel 5, thereby allowing these letters to be easily located during inputting of characters and further allowing Japanese to be easily inputted using Roman letters. In addition, other character inputting switches are provided for other input figures and symbols. Frequently used characters and symbols are arranged on the left side of the panel 5 shown in FIG. 3, and those which are not frequently used are arranged on the right side of the panel 5 shown in FIG. 3. The longitudinal length "g" of the character inputting panel 5 is, for example, three to five centimeters, and the horizontal length "h" thereof may be within the same range. Additionally, the character inputting panel 5 may be provided with function keys (e.g. shift keys) 22a and 22b for selecting capital letters or small letters of the alphabet.

Figure 4:
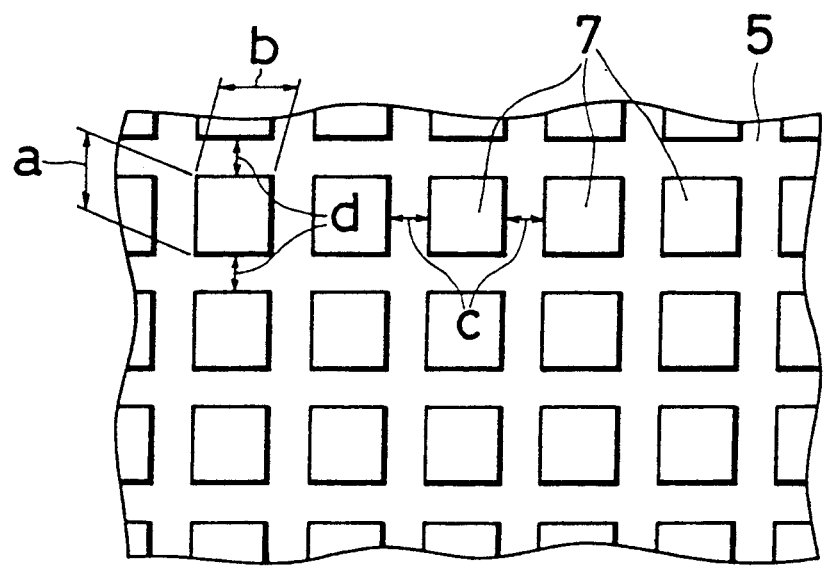
FIG. 4 is a partially enlarged plane view of the character inputting panel 5.

FIG. 4 is a partially enlarged perspective view of the character inputting panel 5. Each character inputting switch 7 has an operating area whose size is "a" long x "b" wide, and each operating area is activated using the tip end 2 of the contact pen 1. The intervals between adjacent operating areas of the character inputting switches 7 are shown by reference letters "c" and "d", and are selected to prevent erroneous operation of adjacent character inputting switches 7.

For example, "a" may be equal to "b", and both "a" and "b" may be 2 to 3 mm and 5 mm at most. Preferably, "a" and "b" are each 3 mm. Furthermore, for example "c" may be equal to "d", and both "c" and "d" may be zero or about 1 mm.

Figure 5:
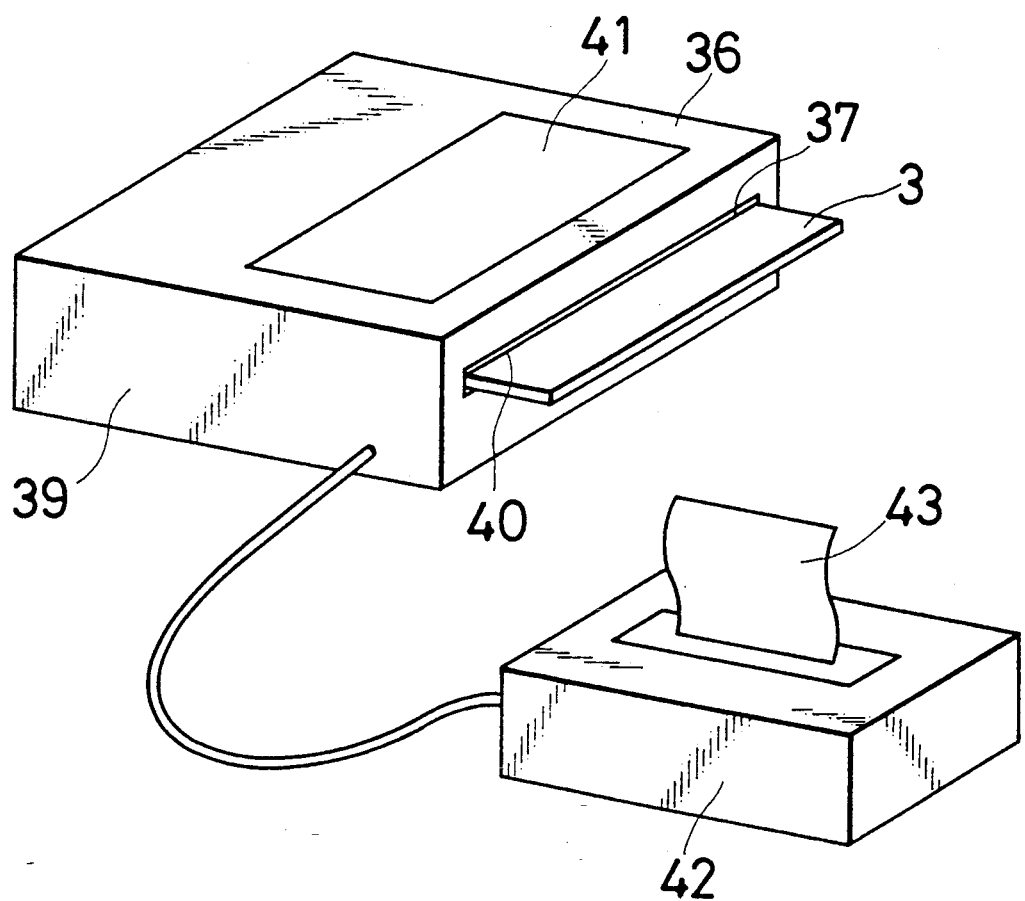
FIG. 5 is a perspective view of an output device 36.
Figure 6:
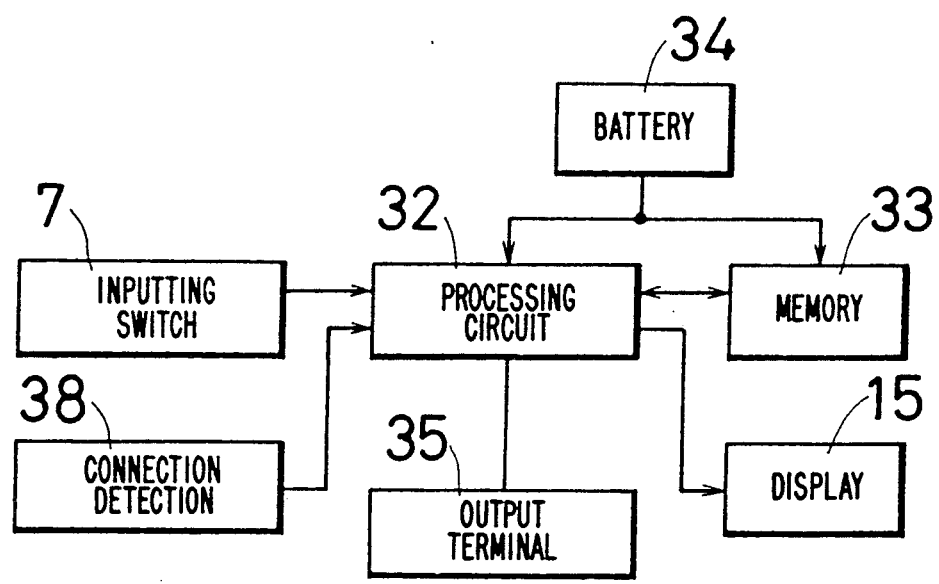
FIG. 6 is a block diagram showing the electrical configuration of the character inputting unit 3.

FIG. 6 is a block diagram showing the electrical configuration of the character inputting unit 3. The outputs from the inputting switches 7 is provided to a processing circuit 32, realized by a micro computer, and this inputted data is stored in a random access memory 33. The processing circuit 32 and the memory 33 are powered by a battery 34. An output terminal 35 is provided at a side of the housing 4 and the data stored in the memory 33 is read out by the processing circuit 32. The data read out by the processing circuit 32 is outputted via the output terminal 35. The connection detecting part 38, provided in the vicinity of the output terminal 35, detects when output terminal 35 is connected to an input terminal 37 of the output unit 36 shown in FIG. 5. The connection detecting part 38 is built in the housing 4. The display 15 is for visual display of the data inputted by the inputting switch 7 and stored in the memory 33 into instructions from the processing circuit 32, the display 15 being carried out by a liquid crystal displaying device.

FIG. 5 is a perspective view of the output device 36 for visually displaying and printing of data stored in the memory 33 of the character inputting unit 3. The output terminal 35 of the character inputting unit 3 is connected to the input terminal 37 of the output device 36. This input terminal 37 is realized by the insertion slot 40 of the housing 39 of the output device 36. The data read out from the memory 33 is displayed on the liquid crystal display 41, and is printed on a recording sheet 43 using a printer 42. The data stored in the memory 33 may be edited and processed for operation in the output device 36.

Figure 7:
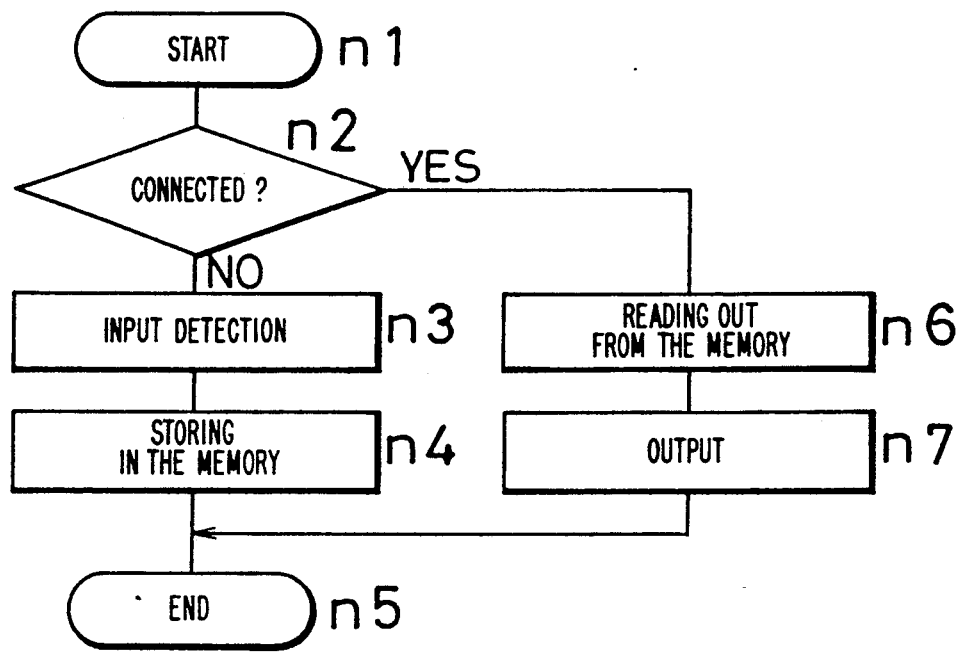
FIG. 7 is a flow chart for explaining the operation of a processing circuit 32 of the character inputting unit 3.

FIG. 7 is a flow chart for explaining the operations of the character inputting unit 3. The operation proceeds from step n1 to the step n2, wherein the processing circuit 32 judges whether or not the output terminal 35 is connected to the input terminal 37, according to the output of the connection detecting part 38. When the output terminal 35 is not connected to the input terminal 37, the input of data via operation of the inputting switches 7 is detected at step n3 by the processing circuit 32, and the inputted data is stored in the memory 33 at step n4.

In the case where the output terminal 35 of the character inputting unit 3 is connected to the input terminal 37 of the output device 36, as is detected by the connection detecting part 38, the processing proceeds from step n2 to step n6. The data stored in the memory 33 is read out at step n6 by the processing circuit 32 and is output on the output terminal 35 at step n7.

Figure 8:
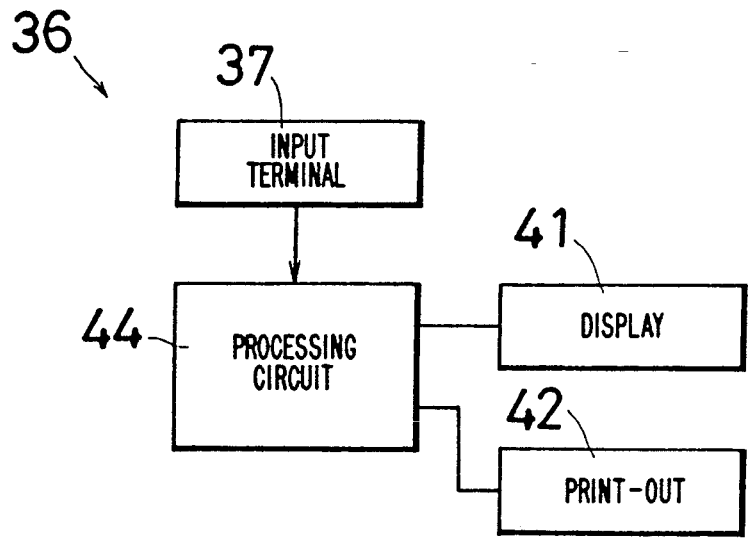
FIG. 8 is a block diagram showing the electrical configuration of output device 36, .

FIG. 8 is a block diagram showing the configuration of the output device 36. The data from the input terminal 37 is provided to the processing circuit 44, realized by a micro computer, in which a sentence may be edited or other data processed. The data is displayed by the display 41 as shown above or is printed on a recording sheet 43 using a printer 42.

Again with reference to FIG. 1, the contact pen 1 is grasped by the thumb 9, the forefinger 10 and the middle finger 11 of the right hand 8 of an operator (assuming the operator is right-handed). The lower part 13 of the hand is placed on the table 31, and the inputting panel 5 having the character inputting switches 7 is arranged such that the tip end 2 of the contact pen 1 can be easily moved along the entire panel 5 with the lower part 13 of the hand 12 placed on the table 31.

Figure 9:
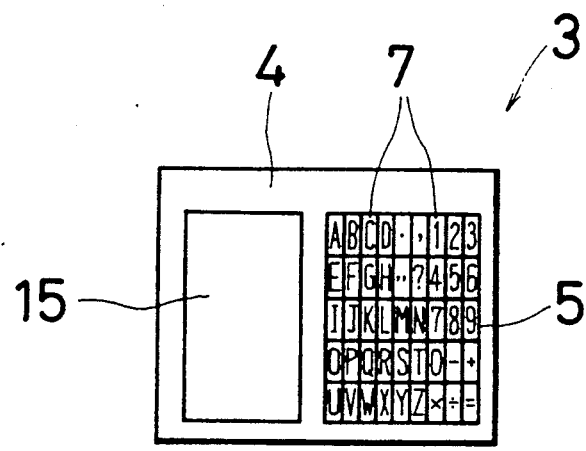
FIG. 9 is a plane view of a character inputting unit of another embodiment of the invention.

FIG. 9 is a plane view showing still another embodiment of the invention. The characters inputting panel 5 is formed at the right side of the housing 4, and the output device 15, such as a liquid crystal display panel, is arranged at the left side of the character inputting panel 5. Since the character inputting panel 5 is arranged at the right side, the character inputting operation can be conducted with the housing 4 placed on the desk top of the table 31, and the lower part of the hand grasping the contact pen on the table 31.

Figure 10:
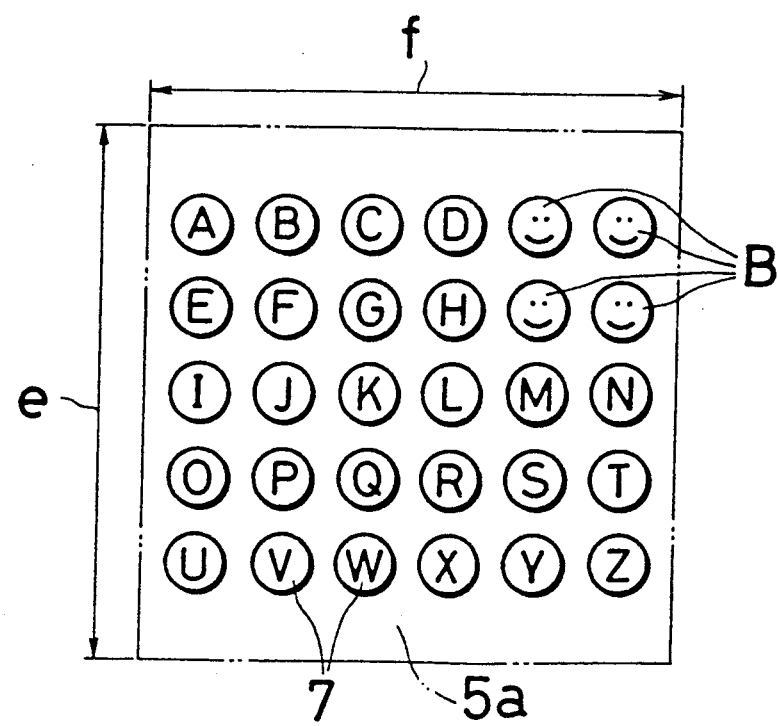
FIG. 10 is a plane view of the character inputting panel 5a of another embodiment of the invention.

FIG. 10 is a plane view showing the character inputting panel 5a of another embodiment of the invention. The vowel letters are arranged vertically at the left side of the character inputting panel 5a. The longitudinal length "e" of the character inputting panel 5a may be, for instance, three centimeters, and the horizontal length "f" may be also three centimeters. In addition, unused areas of the character inputting switches 7 may be provided with a blank symbol as shown by the reference symbol "B" in FIG. 10.

Figure 11:
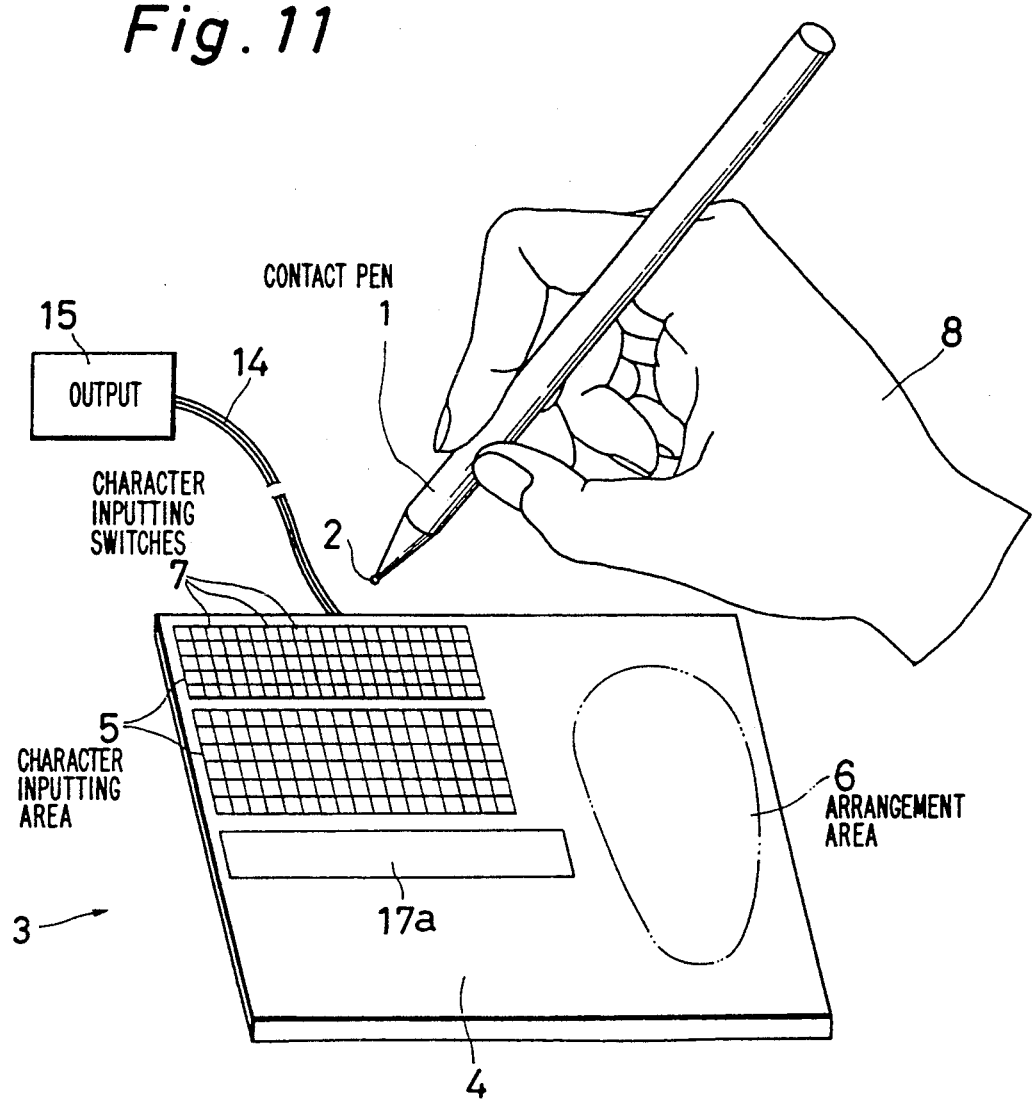
FIG. 11 is a perspective view of still another embodiment of the invention.

FIG. 11 is a perspective view of still another embodiment of the invention. This embodiment is similar to that previously described above. All the corresponding parts carry the same reference number. In this embodiment, particularly, the character inputting panel 5 is composed so that Japanese and Chinese characters can be inputted. The housing 4 is provided with a hand placement area 6. When inputting data, the lower part of the hand 8 is placed on the hand placement area 6, and the inputting operation is effected using the contact pen 1.

Figure 12:
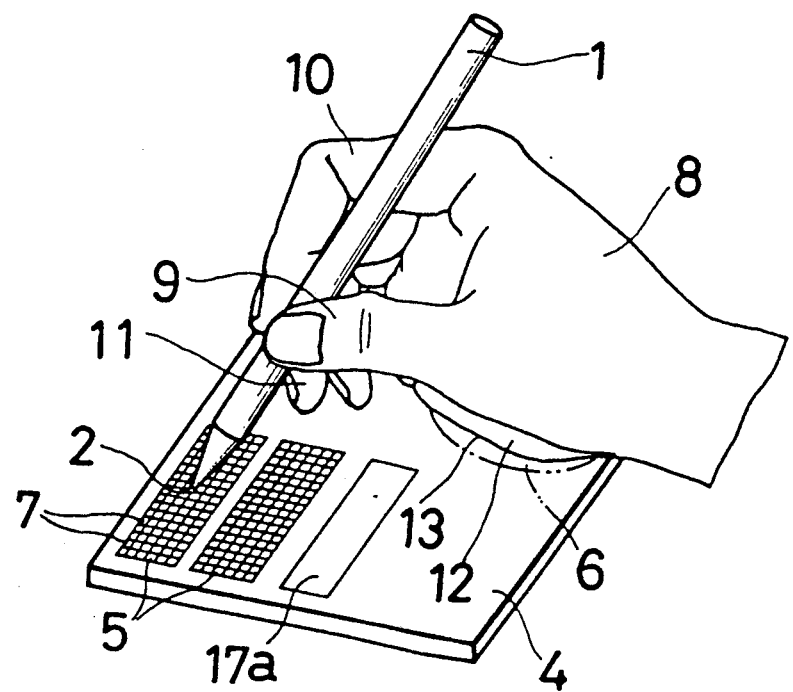
FIG. 12 is a perspective view showing the input operating state of using the character inputting unit shown in FIG. 11.

FIG. 12 shows the inputting operation using the character inputting unit 3 shown in FIG. 11. Each input switch 7 of the character inputting are 5 is operated in response to pressure applied by the tip end 2 of the contact pen 1.

Figure 13:
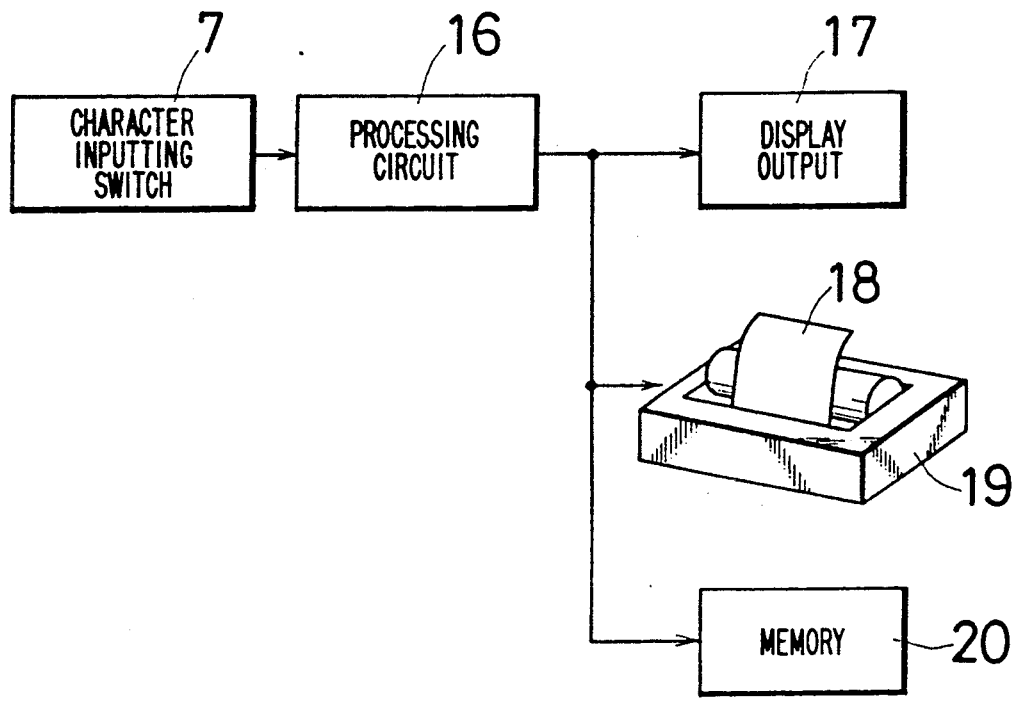
FIG. 13 is a block diagram showing the electric configuration of the embodiment shown in FIGS. 11 and 12.

FIG. 13 is a block diagram showing the electrical configuration of the embodiment shown in FIGS. 11 and 12. The input from the character inputting switches 7 is detected by a processing circuit 16, realized by a micro computer, built in the housing 4, and the character input information is displayed by the output device 15. The output device 15 may be a visual display 17, such as a liquid crystal or a cathode ray tube, or it may be printing unit 19 in which the data is printed on a recording sheet 18. Alternately, the character information is inputted from the character inputting panel 5 is transferred to a memory 9, like a magnetic recording medium such as a random access memory or a floppy disk, where it may be temporarily stored.

A processing circuit 16 may be incorporated in the housing 4. At the same time, the visual display 17 may be provided in the position shown by the area 17a, thereby causing the memory 20 to be housed. Still furthermore, the printing unit 19 may be adopted in the housing 4.

Figure 14:
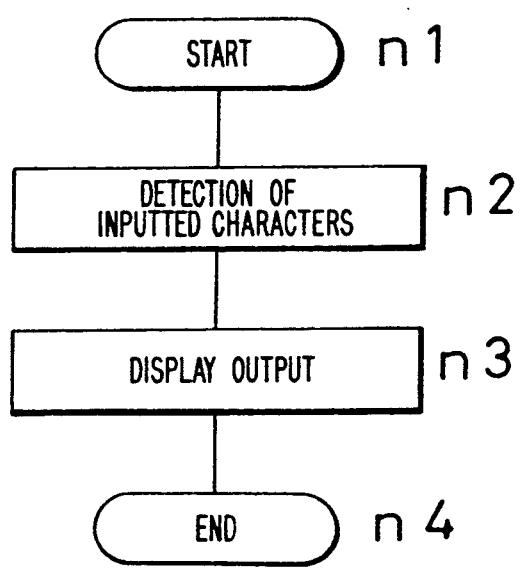
FIG. 14 is a flow chart for explaining the operations of the processing circuit 16 shown in FIG. 13, FIGS. 15(1) and 15(2) are enlarged plane views of the character inputting panels 5b and 5c of the another embodiment of the invention.

FIG. 14 is a flow chart for explaining the operations of the processing circuit 16. The processing proceeds from the step n1 to the step n2, and the character input information inputted by the operator using the character inputting panel 5 is detected by the processing circuit 16. At step n3, the inputted data is outputted by the output device 15. The output device 15 may be composed so that the inputted character information can be outputted in voice format. In this case, the output device 15 includes a voice composing circuit.

FIG. 15 is an enlarged plane view of the character inputting panels 5b and 5c of another embodiment of the invention. In FIG. 15 (1), the vowel letters are arranged at the upper portion of the character input panel 5b. On the other hand, in FIG. 15 (2), the vowel letters are arranged at the left side of the character inputting panel 5c.

Also, the vowel letters may be arranged at the right side or at the lower portion of the character inputting panels 5, 5a through 5c. Characters to be inputted may be Japanese KATAKANA and KANJI letters or graphic figures, in addition to alphanumeric letters and Japanese HIRAGANA letters as shown above.

Figure 16:
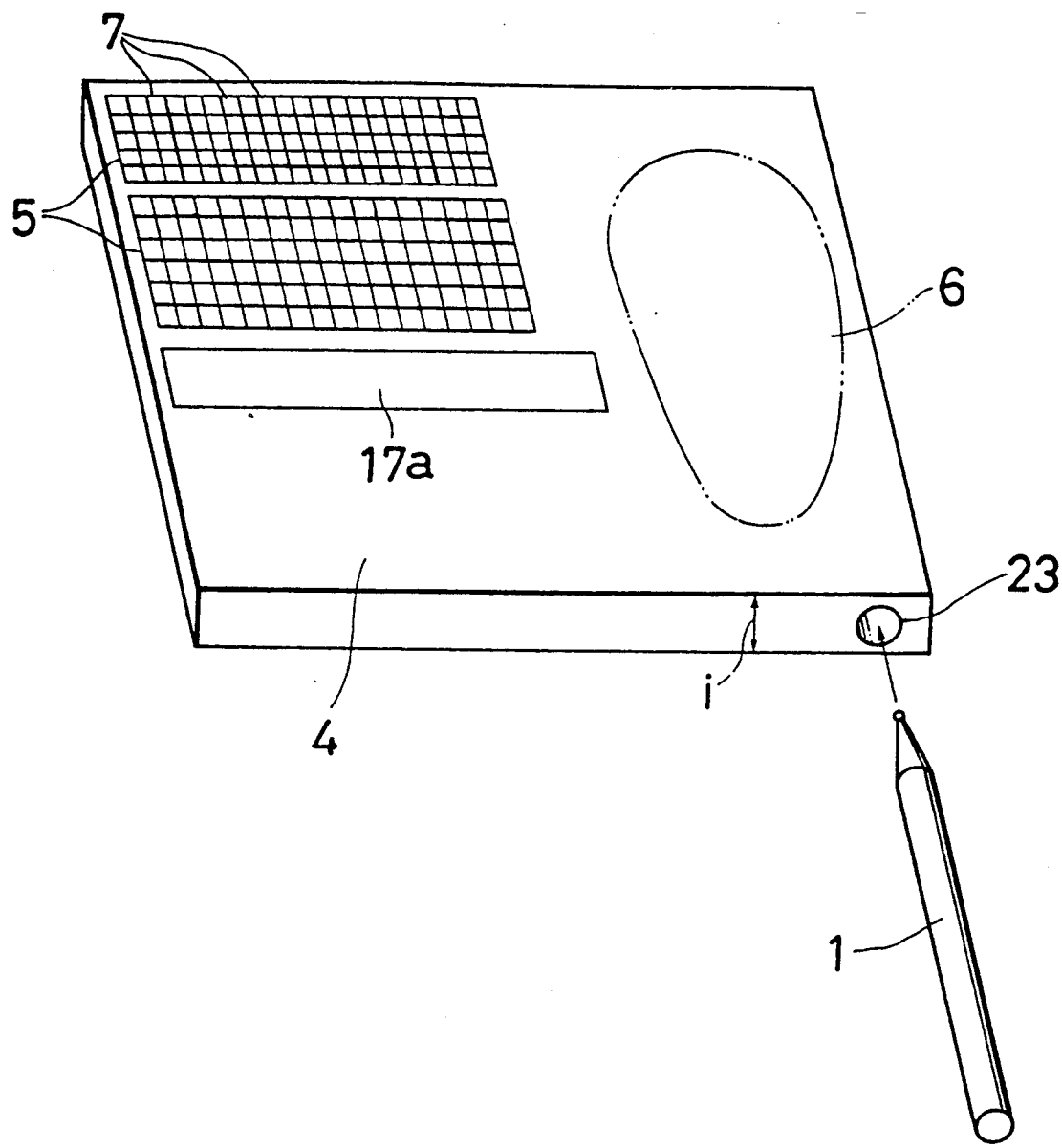
FIG. 16 is a simplified perspective view of the character inputting unit 3 of another embodiment of the invention.

FIG. 16 is a perspective view of still another embodiment of the invention. In this embodiment, the housing 4 has a comparatively large thickness "i", and an aperture 23 having a cylindrical inner diameter is formed in the housing 4. The contact pen 1 is conveniently housed in the aperture 23, thereby reducing the possibility that contact pen 1 will be lost during nonuse.

Figure 17:
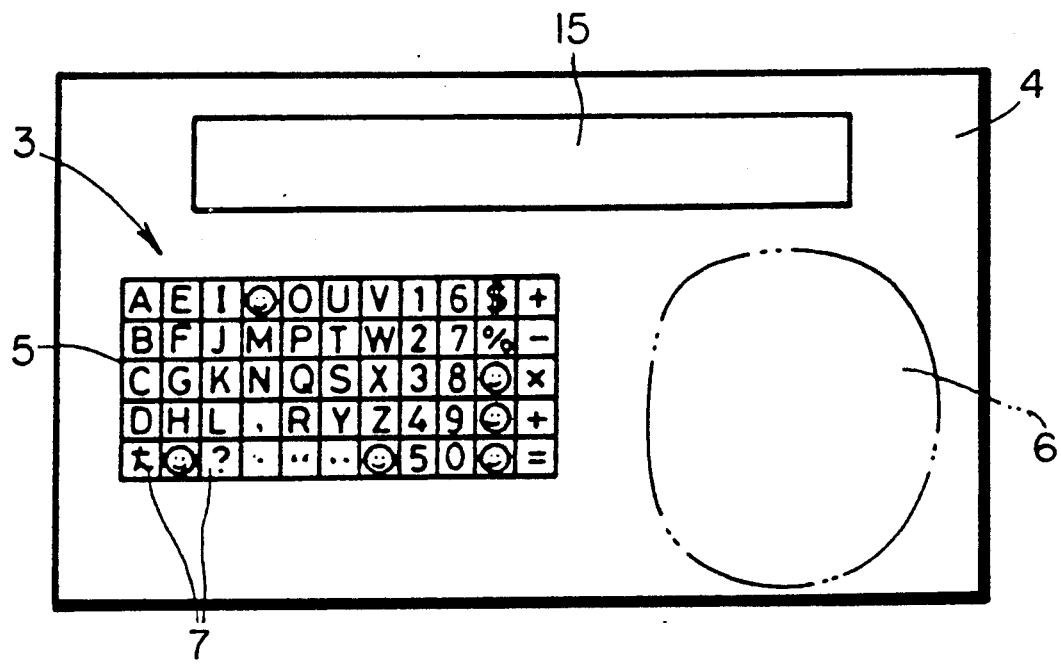
FIG. 17 is a plane view showing a configuration in which the character inputting unit 3 and the output unit 15, are integrally mounted in a single housing.

FIG. 17 is a simplified plane view of another embodiment of the invention. The output device 15 is integrally mounted in the housing 4. The shape of the housing 4 in which the character inputting unit 3 and the output device 15 are integrally composed is in the form flat rectangular body. The output device 15 may be a liquid crystal display as mentioned above. According to such a composition, since the character inputting unit 3 and the output device 15 are integrally composed in a single housing, it is possible to confirm the inputted character information.

Figure 18:
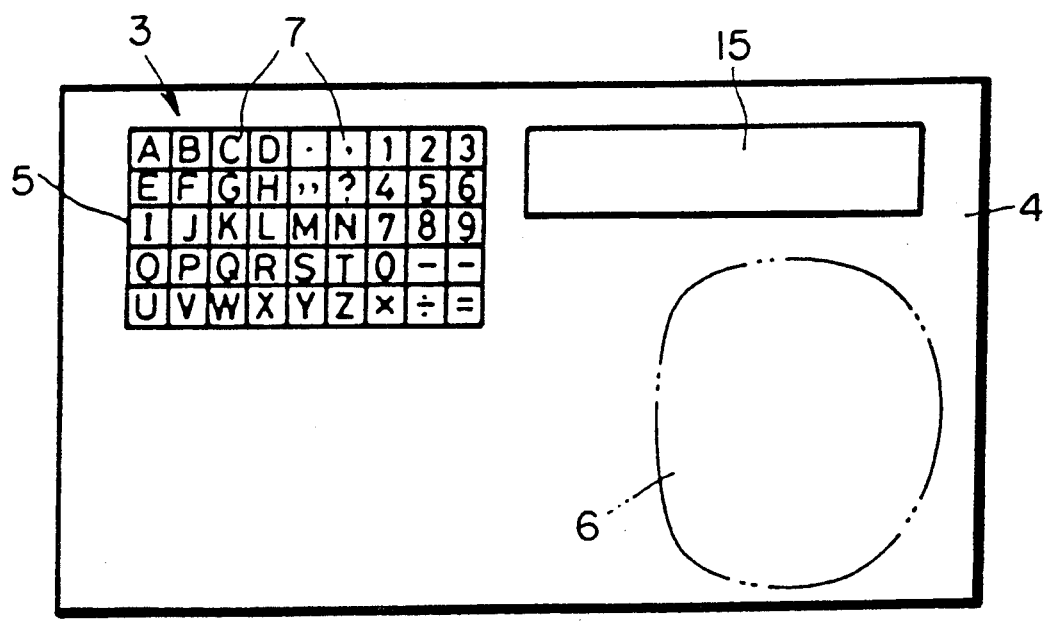
FIG. 18 is a plane view showing still another embodiment of the invention.

FIG. 18 is a simplified plane view of still another embodiment of the invention. Though the output device 15 is arranged at the upper portion of the inputting unit 3 in the embodiment shown in FIG. 17, the inputting unit 3 may be installed to the left of the output device 15 as shown in FIG. 18.

According to still another embodiment of the invention, the vowel letters may be arranged not only horizontally or vertically, but also diagonally.

According to another embodiment of the invention, character inputted information is once stored in a memory 20 which is housed in the housing 4, thereby permitting the character inputting unit 3 to be used instead of a memorandum pad. Moreover, the data stored in the memory 20 can be visually displayed, or printed out on a recording sheet 18, by providing the data to a visual display means 17 or the printing device 19 which are externally provided. The memory 20 may be housed in a card-like body and removable from the housing 4. Alternately, a connection terminal may be provided in the housing 4, thereby permitting the housing 4 to be connected to or disconnected from the visual display 17 or the printing device 19.

According to another embodiment of the invention, the character inputting switches 7 each may be a pressure sensor, a contact type sensor utilizing electrostatic capacitance, a magnet detecting sensor or a proximity switch.

According to still another embodiment of the invention, the character inputting panels 5, 5a through 5c, and 26 through 29 is sized to conform to the hand of an operator, and to be suitable to the eyesight of the operator.

According to another embodiment of the invention, the contact pen 1 may be connected to the processing circuit 16 by means of a flexible lead wire, and the character inputting panel 5 may be connected to the processing circuit 16, thereby causing characters to be inputted by contacting the contact pen 1 with the character inputting panel 5.

The visual display 17 may be effected by a liquid crystal device, a cathode ray tube or light emitting diodes. Thus, the character inputting panel and the visual displaying area are respectively formed in the displaying area of the visual display 17 and 17a. A transparent sheet-like switch is provided at the character inputting panel, and this transparent sheet-like switch is furnished with switching elements individually corresponding to many characters. Then, characters are displayed in accordance with each switching element. Thus, each character can be inputted by applying pressure to the panel were appropriate.

Also, the character inputting switches 7 may be composed so that a transparent sheet-like switch may be installed on the surface of a display area such as a liquid crystal or cathode ray tube.

In the prior art, a key board on which the inputting operation is conducted using the tips of the finger, and the display device, such as a cathode ray tube, is separately provided and connected via a flexible connection line. In such prior art configurations, the installation space becomes large, and it is necessary for an operator to repeatedly look back and forth between the key board and the display. Also, since the key board and the display are connected by a connection line, there is still another problem in that the signal transmission rate thereof may be lowered. The present invention can solve these problems.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An alphanumeric character input device comprising:
    a flat housing defining a planar top surface and a plurality of side surfaces;
    a character input panel located on said planar top surface of said flat housing, said character input panel including a plurality of character input pads each having indicia thereon corresponding to alphanumeric characters, said character input pads extending in rows along said length of said top planar surface and in columns along said width of said top planar surface, wherein each of said character input pads has a length between 2 mm and 5 mm inclusive and a width between 2 mm and 5 mm inclusive, and wherein a distance between adjacent character input pads is about 1 mm, wherein respective character input pads are aligned in a row which include indicia denoting each vowel character A, E, I, O and U, and wherein respective character input pads are aligned in columns, beneath each respective vowel character, which include indicia denoting each consonant character arranged in alphabetical order;
    a contact pen having an elongated shape and first and second end portions, said first end portion having a rounded end point for individually contacting said plurality of character input pads;
    said flat housing including an aperture means for storing said contact pen during nonuse of the character input device, said aperture means defining an opening n one of said plurality of side surfaces of said flat housing and a cylindrical aperture extending from said opening dimensioned to accommodate said contact pen within said flat housing;
    a plurality of switch means, respectively coupled to and associated with said plurality of character input pads and located within said flat housing, for switching in response to contact between an associated one of said plurality of character input pads and said rounded end point of said contact pen;
    a display means, located within said flat housing, for displaying on a display panel and alphanumeric characters corresponding to the plurality of character input pads which have made contact with said rounded end point of said contact pen, said display panel being located on said planar top surface of said flat housing below said character input panel;
    said planar top surface of said flat housing further including indicia denoting a hand platement section located to the right of said character input panel and said display panel, wherein a hand of an operator grasping said contact pen is rested and stationary on said hand displacement section of said planar top surface during operation of the character input device;
    a processor means, coupled to said display means and to said plurality of switch means and located within said flat housing, for controlling the display of the alphanumeric characters by said display means in response to the switching of said plurality of switch means;
    a memory means, coupled to said processing means and located within said flat housing, for storing the alphanumeric characters corresponding to the plurality of character input pads which have made contact with said rounded end point of said contact pen; and,
    an output terminal means, coupled to said processing means and having terminals located at a side surface of said flat housing, for detachably electrically connecting to an output device and for outputting the alphanumeric characters stored in said memory means to the output device;
    said processor means including means for controlling said memory means and said output terminal means.

2. An alphanumeric character input apparatus comprising:
    a portable alphanumeric character input device;
    an output device for detachably electrically connecting to said portable alphanumeric character input device and for reading alphanumeric characters stored in said portable alphanumeric character input device said output device including a housing having an aperture formed in a surface thereof, said aperture dimensioned to receive said portable alphanumeric character input device, said output device further including a display for displaying the alphanumeric characters read from said portable alphanumeric character input device; and,
    a printer device, operatively coupled to said output device, for printing the alphanumeric characters read by said output device;
    said portable alphanumeric character input device comprising:
    a flat housing defining a planar top surface and a plurality of side surfaces, said planar top surface having a length of about 8.5 cm and a width of about 5.4 cm;
    a character input panel located on said planar top surface of said flat housing, said character input panel including a plurality of character input pads each having indicia thereon corresponding to alphanumeric characters, said character input pads extending in rows along said length of said top planar surface and in columns along said width of said top planar surface wherein each of said character input pads has a length between 2 mm and 5 mm inclusive and a width between 2 mm and 5 mm inclusive, and wherein a distance between adjacent character input pads is about 1 mm, wherein respective character input pads are aligned in a row which include indicia denoting each vowel character A, E, I, O and U, and wherein respective character input pads are aligned in columns, beneath each respective vowel character, which include indicia denoting each consonant character arranged in alphabetical order;

a contact pen having an elongated shape and first and second end portions, said first end portions having a rounded end point for individually contacting said plurality of character input pads;

a plurality of switch means, respectively coupled to and associated with said plurality of character input pads and located within said flat housing, for switching in response to contact between an associated one of said plurality of character input pads and said rounded end point of said contact pen;

a display means, located within said flat housing, for displaying on a display panel the alphanumeric characters corresponding to the plurality of character input pads which have made contact with said rounded end point of said contact pen, said display panel being located on said planar top surface of said flat housing;

a processor means, coupled to said display means and to said plurality of switch means and located within said flat housing, for controlling the display of the alphanumeric characters by said display means in response to the switching of said plurality of switch means;

a memory means, coupled to said processing means and located within said flat housing, for storing the alphanumeric characters corresponding to the plurality of character input pads which have made contact with said rounded end point of said contact pen; and, an output terminal means, coupled to said processing means and having terminals located at a side surface of said flat housing, for detachably electrically connecting to the output device and for outputting the alphanumeric characters stored in said memory means to the output device;

said processor means including means for controlling said memory means and said output terminal means.

* * * * *